US007653234B2

(12) United States Patent
Warren et al.

(10) Patent No.: US 7,653,234 B2
(45) Date of Patent: *Jan. 26, 2010

(54) METHOD FOR COMMUNICATING AND MATCHING ELECTRONIC FILES FOR FINANCIAL TRANSACTIONS

(75) Inventors: Joel Edward Warren, Brentwood, TN (US); Reed Avon Beatse, Taylorsville, UT (US); Jeremy Philip Becker, San Francisco, CA (US); Thomas Vincent Costello, Southhampton, PA (US); Hugh Francis Guilbeau, Jr., San Francisco, CA (US); Gopa Kumar, Castro Valley, CA (US); Kevin Jude McCabe, Franklin, MA (US); Bruce Allen McPherson, Sausalito, CA (US); David James Moore, Fairfax, CA (US); Marilee Jean Niemi, Oakland, CA (US); Danny Shawn Oursbourn, Rowlett, TX (US); Cynthia Lynne Rasche, Arlington Heights, IL (US)

(73) Assignee: Federal Reserve Bank of Atlanta, Atlanta, GA (US)

( * ) Notice: Subject to any disclaimer, the term of this patent is extended or adjusted under 35 U.S.C. 154(b) by 755 days.

This patent is subject to a terminal disclaimer.

(21) Appl. No.: 11/337,323

(22) Filed: Jan. 23, 2006

(65) Prior Publication Data

US 2006/0140469 A1 Jun. 29, 2006

Related U.S. Application Data

(63) Continuation of application No. 10/439,118, filed on May 15, 2003, now Pat. No. 6,990,224.

(51) Int. Cl.
*G06K 9/00* (2006.01)

(52) U.S. Cl. ........................................ 382/137; 382/218

(58) Field of Classification Search ................. 382/137, 382/138, 139, 140, 218, 229; 235/375, 379, 235/383, 385; 705/35, 39, 45, 24, 64–79
See application file for complete search history.

(56) References Cited

U.S. PATENT DOCUMENTS 4,321,672 A 3/1982 Braun et al.

(Continued)

FOREIGN PATENT DOCUMENTS

| JP | 2001307062 A | 11/2001 |
| JP | 2002032386 A | 1/2002 |
| JP | 2002366573 A | 12/2002 |

OTHER PUBLICATIONS

Federal Reserve System's National Adjustments Initiatives, BAI Float Management Conference, Feb. 5, 2002.

(Continued)

*Primary Examiner*—Brian Q Le
(74) *Attorney, Agent, or Firm*—King & Spalding LLP

(57) ABSTRACT

Communicating and matching electronic files for a check adjustment case comprises communicating an electronic check adjustment message comprising key data relating to the case, communicating an electronic image of a document to follow ("DTF") related to the case, associating the key data with the electronic DTF image, determining whether the electronic message's key data matches the key data associated with the electronic DTF image, and linking the electronic message to the electronic DTF image in response to a determination that the electronic message's key data matches the key data associated with the electronic DTF image. If the DTF image's key data does not match the message's key data, matching electronic files can comprise correcting errors in the key data associated with the electronic DTF image and performing a secondary match routine. An operator accesses the electronic message and the linked DTF image to resolve the check adjustment case.

60 Claims, 12 Drawing Sheets

U.S. PATENT DOCUMENTS

| | | | |
|---|---|---|---|
| 4,960,981 A | 10/1990 | Benton et al. |
| 5,237,158 A | 8/1993 | Kern et al. |
| 5,523,954 A | 6/1996 | Weaver et al. |
| 5,594,225 A | 1/1997 | Botvin |
| 5,689,626 A | 11/1997 | Conley |
| 5,706,365 A | 1/1998 | Rangarajan et al. |
| 5,822,454 A | 10/1998 | Rangarajan |
| 5,832,463 A | 11/1998 | Funk |
| 5,905,863 A | 5/1999 | Knowles et al. |
| 5,930,778 A | 7/1999 | Geer |
| 5,987,437 A | 11/1999 | Franklin |
| 6,047,067 A | 4/2000 | Rosen |
| 6,061,478 A | 5/2000 | Kanoh et al. |
| 6,625,313 B1 | 9/2003 | Morita et al. |
| 6,990,224 B2 | 1/2006 | Warren et al. |
| 2002/0116379 A1 | 8/2002 | Lee et al. |
| 2002/0176628 A1 | 11/2002 | Starkweather |
| 2003/0202690 A1 | 10/2003 | Jones et al. |

OTHER PUBLICATIONS

Federal Reserve Bank of San Francisco, Request for Proposal #00-032 Facsimile/OCR Service, Oct. 25, 2000.

Office Action dated Mar. 1, 2005 for U.S. Appl. No. 10/439,118.

Notice of Allowance dated Oct. 27, 2005 for U.S. Appl. No. 10/439,118.

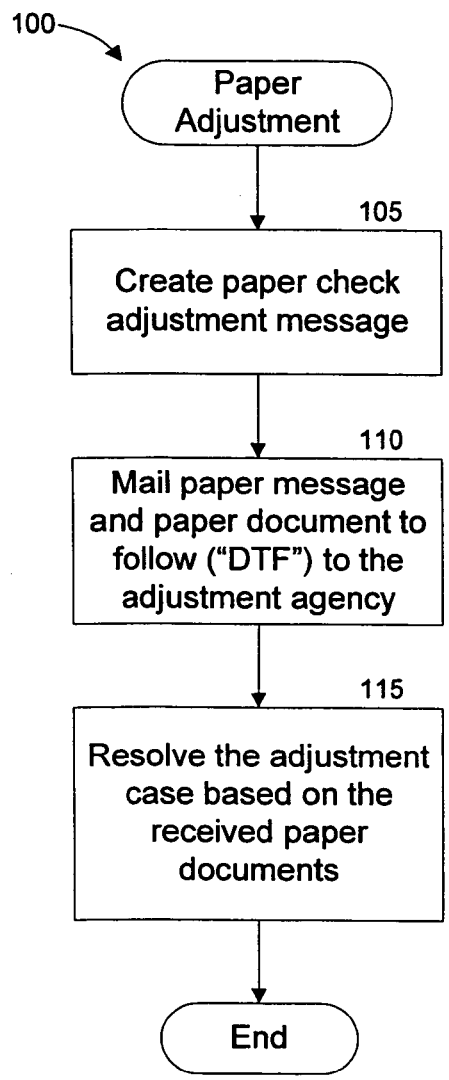
Conventional
Figure 1
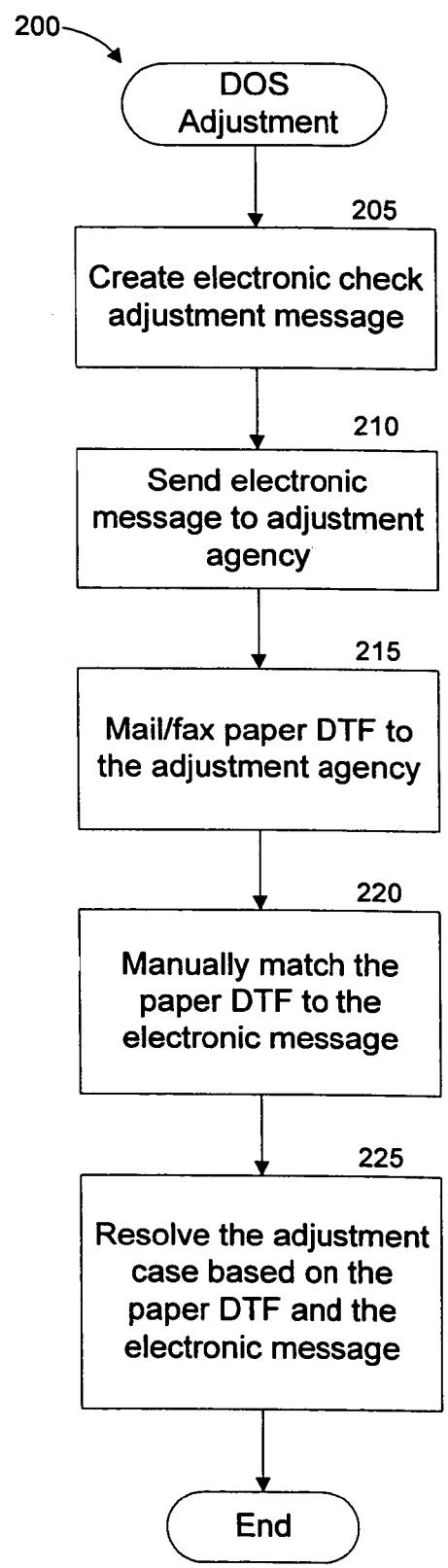
Conventional
Figure 2

1200

1202 — Form Data

CHECK ADJUSTMENT

1204

| 1204a | ABA #: | 111033752 |
| 1204b | AMOUNT: | $2,001.00 |
| 1204c | SREF: | 1111 |
| 1204d | ITYP: | ENL |
| 1204e | DATE: | 07/22/2002 |
| 1204f | RREF: | |

Comments:

Number of pages (including cover sheet):

Figure 12

METHOD FOR COMMUNICATING AND MATCHING ELECTRONIC FILES FOR FINANCIAL TRANSACTIONS

RELATED PATENT APPLICATION

This application is a continuation of, and claims priority to, U.S. patent application Ser. No. 10/439,118 filed May 15, 2003 and entitled "Method and System for Communicating and Matching Electronic Files for Financial Transactions" (now U.S. Pat. No. 6,990,224). The subject matter of the above-identified priority application is hereby fully incorporated herein by reference.

FIELD OF THE INVENTION

The present invention relates to settlement of financial transactions. Particularly, the present invention relates to matching related electronic documents in a check adjustment case to resolve errors originating during check clearing and settlement.

BACKGROUND OF THE INVENTION

Individuals, businesses, and governments use checks widely in the United States and other countries. Checks are almost universally accepted and are a convenient, familiar, and reliable method of payment. Additionally, the check clearing process for obtaining payment on a check is well established.

A check writer (or drawer or maker) writes a check to order his bank to withdraw funds from his account to pay a named payee. To obtain payment, the payee deposits the check with his bank (the bank of first deposit or "BOFD"). Then, the BOFD credits the check amount to the payee's account. To obtain settlement of the check, the BOFD presents the check to the drawer's bank (the "paying bank") for payment. The BOFD may present the check directly to the paying bank, through a local clearinghouse or exchange, or through an intermediary bank or banks. An intermediary bank can comprise a purely private sector depository institution or a Federal Reserve Bank. When the paying bank receives the check, it settles with the bank that presented the check and deducts the amount of the check from the drawer's account.

Banks use a check adjustments process to correct errors in the check collections process. For example, if the BOFD presents directly a $1,000 check to the paying bank, and the paying bank mistakenly pays only $100 to the BOFD, then the BOFD can request a check adjustment to correct the error.

To perform a check adjustment, a depository institution ("DI") or their agent creates a check adjustment request in the form of a document or a message. The DI can be the paying bank, the BOFD, an intermediary bank, or an agent for the DI. The check adjustment request message includes the relevant information for correcting the error. For example, the relevant information can comprise routing information for the paying bank and the BOFD, the drawer's and payee's account information, the error amount, and other relevant information. The relevant information for a check adjustment varies depending on the particular requirements of the requesting party.

The DI requesting the check adjustment (the "requesting agency") sends the check adjustment message to the intermediary or directly to the other DI (the "adjustment agency"). The adjustment agency may require proof of the error before resolving the check adjustment. The proof is called a "document to follow" ("DTF") and typically comprises a copy of the actual check and, if needed, other supporting documents. Accordingly, in most circumstances, the requesting agency must send the DTF to the adjustment agency to resolve the check adjustment case.

FIG. 1 is a flow chart illustrating a conventional method 100 for forwarding and matching a check adjustment message and an associated document to follow for resolving a check adjustment case. Referring to FIG. 1, in step 105, a requesting agency creates a paper check adjustment message that includes the relevant information about the error. In step 110, the requesting agency mails the paper message and a paper DTF to the adjustment agency. When the adjustment agency receives the paper documents, the adjustment agency researches and resolves the check adjustment case in step 115 based on the paper DTF and the paper check adjustment message. Because the adjustment agency receives a paper check adjustment message, the adjustment agency also must enter the relevant data into a computer for processing.

FIG. 2 is a flow chart illustrating another conventional method 200 for forwarding and matching a check adjustment message and an associated document to follow for resolving a check adjustment case. In step 205 of FIG. 2, the requesting agency creates an electronic check adjustment request message using a DOS computer application program having a direct link to an adjustment agency that provides the DOS based computer application, network, and check adjustment processing service. In step 210, the requesting agency sends the electronic message to the adjustment agency over the DOS link. The requesting agency sends a paper DTF in step 215 to the adjustment agency by mail or facsimile transmission. Accordingly, the adjustment agency receives an electronic check adjustment message and a paper DTF. In step 220, the adjustment agency manually matches the paper DTF to the electronic message. Then, in step 225, the adjustment agency researches and resolves the adjustment case based on the paper DTF and the electronic message.

The conventional methods of resolving a check adjustment case include several deficiencies. For example, the time-consuming step of mailing the check adjustment message and/or the DTF delays resolution of the check adjustment case. While creating an electronic check adjustment message can increase the speed of initiating a check adjustment case, the conventional methods still require sending a paper version of the DTF. Accordingly, the check adjustment process involves another time-consuming delay while the paper DTF is mailed or faxed to the adjustment agency. Additionally, the adjustment agency must manually match the electronic message to the paper DTF. That manual matching process also can be time-consuming, as well as prone to error.

Accordingly, a need exists in the art for a method and system for resolving check adjustment cases that overcomes the deficiencies of the conventional methods. Thus, a need in the art exists for creating and sending an electronic check adjustment message and an electronic DTF. Furthermore, a need exists in the art for matching an electronic check adjustment message to an electronic DTF.

SUMMARY OF THE INVENTION

The present invention provides a system and method for resolving a check adjustment case that overcome the deficiencies of conventional methods. The present invention can reduce or eliminate the need for a paper document that supports the check adjustment case by communicating an electronic image of a supporting document to follow ("DTF"), matching the DTF image with a corresponding electronic check adjustment message, and linking the DTF image with the matching electronic check adjustment message. An operator can access the electronic message and the linked DTF image to research and resolve the check adjustment case. Accordingly, the present invention can reduce or eliminate the delays of conventional methods, which occur during transmission of a paper document and manual matching of that paper document to a check adjustment message.

The present invention also provides a system and method for communicating and matching electronic files for a transaction. The present invention can reduce or eliminate the need for a paper document that supports the transaction by communicating an electronic image of a supporting document to follow ("DTF"), matching the DTF image with a corresponding electronic message, and linking the DTF image with the matching electronic message. An operator can access the electronic message and the linked DTF image to resolve or complete the transaction. Accordingly, the present invention can reduce or eliminate the delays of conventional methods, which occur during transmission of a paper document and manual matching of that paper document to a message.

In one aspect of the present invention, communicating and matching electronic files for a check adjustment case comprises sending an electronic check adjustment message comprising key data relating to the case, sending an electronic image of a document to follow ("DTF") related to the case, associating the key data with the electronic DTF image, determining whether the electronic message's key data matches the key data associated with the electronic DTF image, and linking the electronic message to the electronic DTF image in response to a determination that the electronic message's key data matches the key data associated with the electronic DTF image. An operator typically accesses the electronic message and the linked DTF image to resolve the check adjustment case.

In another aspect of the present invention, a system for communicating and matching electronic files for a check adjustment case comprises a client computer that communicates an electronic check adjustment message comprising key data relating to the check adjustment case. A check adjustment server receives the electronic check adjustment message and stores multiple electronic check adjustment messages. An image capturing device captures and communicates an electronic image of a DTF and the key data associated therewith. A DTF archive receives the electronic DTF image and stores a plurality of electronic DTF images and associated key data. The check adjustment server also determines whether a stored electronic message's key data matches a stored electronic DTF image's key data and links the respective electronic message to the respective electronic DTF image in response to a determination that the message's key data matches the DTF image's key data.

These and other aspects, objects, and features of the present invention will become apparent from the following detailed description of the exemplary embodiments, read in conjunction with, and reference to, the accompanying drawings.

BRIEF DESCRIPTION OF THE DRAWINGS

FIG. 1 is a flow chart illustrating a conventional method for forwarding and matching a check adjustment message and an associated document to follow for resolving a check adjustment case.

FIG. 2 is a flow chart illustrating another conventional method for forwarding and matching a check adjustment message and an associated document to follow for resolving a check adjustment case.

FIG. 12 illustrates a facsimile cover sheet for transmitting an electronic document to follow according to an exemplary embodiment of the present invention.

DETAILED DESCRIPTION OF EXEMPLARY EMBODIMENTS

Figure 3:
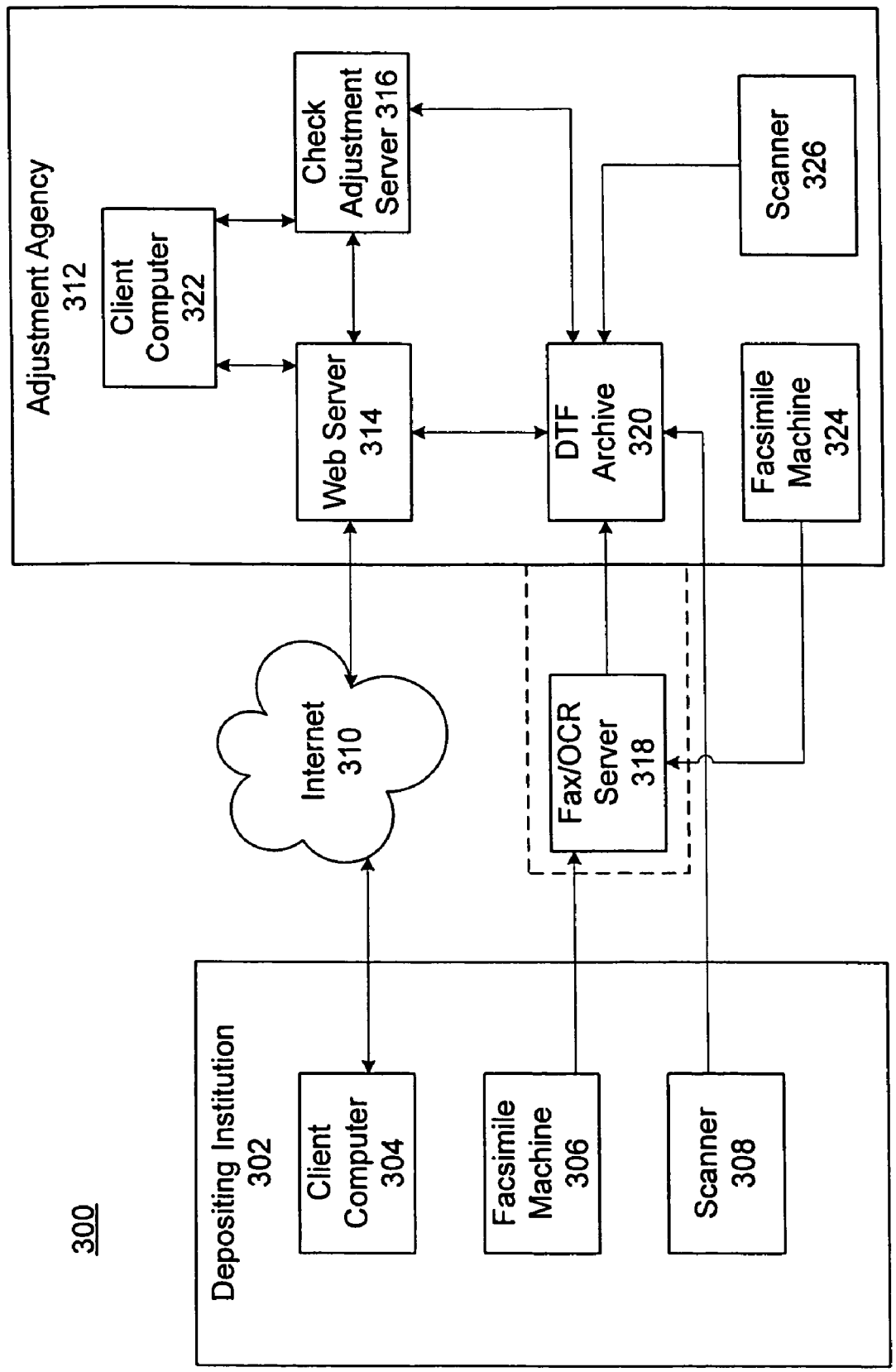
FIG. 3 is a block diagram depicting a system for performing check adjustments according to an exemplary embodiment of the present invention.

The present invention provides a system and method for resolving a check adjustment case using an electronic check adjustment message and an electronic document to follow ("DTF"). A requesting agency can send an electronic check adjustment message comprising key data relating to the check adjustment case to an adjustment agency. The requesting agency also can send an electronic image of the DTF comprising the key data to the adjustment agency. The adjustment agency can match the electronic DTF image to the electronic message by comparing the message's key data to the DTF image's key data. Then, the adjustment agency can link the message and the image by associating a check adjustment case number with both items. An operator can access the message and the linked image to resolve the check adjustment case.

The system and method of the present invention can be used to communicate and match electronic messages and electronic supporting documents for a variety of other financial transactions or other transactions. For example, the system and method of the present invention can communicate and match an electronic message comprising a loan application and electronic documents to support the application. In that case, the electronic supporting documents can comprise pay statements or other personal financial information. The matched electronic documents can be linked to allow an operator to access the linked documents and complete the transaction. In other exemplary embodiments, the system and method of the present invention can be used to match and link attachments to contracts; drivers license and social security card images to employment applications; evidence of actual account activity to disputed billing records, documents indicating hotel stays, airline travel, or car rental to bonus points account information; and estimates and other supporting documents for insurance claims. The present invention is suitable for matching any type of electronic supporting documents to related electronic messages or files.

The present invention comprises a computer program that embodies the functions described herein and illustrated in the appended flow charts. However, it should be apparent that there could be many different ways of implementing the invention in computer programming, and the invention should not be construed as limited to any one set of computer program instructions. Further, a skilled programmer would be able to write such a computer program to implement an embodiment of the disclosed invention based on the flow charts and associated description in the application text. Therefore, disclosure of a particular set of program code instructions is not considered necessary for an adequate understanding of how to make and use the invention. The inventive functionality of the claimed computer program will be explained in more detail in the following description read in conjunction with the figures illustrating the program flow.

Referring now to the drawings, in which like numerals represent like elements, aspects of the exemplary embodiments will be described.

FIG. 3 is a block diagram illustrating a system 300 for performing check adjustments according to an exemplary embodiment of the present invention. Referring to FIG. 3, the exemplary system 300 comprises a depository institution ("DI") 302 and an adjustment agency 312 connected over a distributed network. The DI can comprise a BOFD, an intermediary bank, a paying bank, or other depository institution. As illustrated in FIG. 3, the distributed network can comprise the Internet 310. In an exemplary embodiment, the adjustment agency 312 can comprise a Federal Reserve Bank. In alternative exemplary embodiments, the adjustment agency 312 can comprise an intermediary bank or other DI.

In the exemplary embodiment illustrated in FIG. 3, the DI 302 comprises a "requesting agency" that initiates a request for a check adjustment. A client computer 304 of the DI 302 accesses a web server 314 of the adjustment agency 312 through the Internet 310. The web server 314 typically comprises an application computer program accessible by the client computer 304. The application computer program presents a check adjustment message template on the client computer 304. Accordingly, the DI 302 can create a check adjustment message using the check adjustment template provided by the web server 314. The check adjustment template comprises key data related to a check adjustment case. In an exemplary embodiment, the key data can comprise a routing transit number of the agency requesting the check adjustment case (the DI in this case), a check adjustment amount representing the amount of the check error, an internal reference number assigned by the requesting agency, an investigation type, and a cash letter date for the item to which the case pertains.

In another exemplary embodiment, the key data also can comprise any of a routing transit number of the adjustment agency, a message type (such as "OPEN" or "CLOSED"), and entry type (such as "Debit," "Credit," or "Request for Information"), a receiver's reference number if the message refers to an existing check adjustment case (the case number assigned by the adjustment agency), a contact name, contact telephone number, an indication of how the supporting DTF will be transmitted (such as by mail, facsimile, or other electronic transmission), specific information identifying the check at issue (the routing transit number of the drawee bank and the BOFD, name of the drawer, name of the payee, drawer's account number, and the check number), and other relevant information.

To initiate the check adjustment case, the DI 302 completes the check adjustment message on the client computer 304 and communicates the electronic check adjustment message from the client computer 304 to the web server 314 via the Internet 310. The web server 314 communicates the electronic check adjustment message to a check adjustment server 316. The check adjustment server 316 stores the received electronic check adjustment message in its memory archive. Additionally, the check adjustment server assigns a check adjustment case number to the received check adjustment message.

The application computer program of the web server 314 also presents a facsimile cover sheet on the client computer 304 for facsimile transmission of the supporting DTF. FIG. 12 illustrates a representative facsimile cover sheet 1200 for transmitting an electronic document to follow according to an exemplary embodiment of the present invention. As shown, the cover sheet 1200 comprises a form data section 1202. In an exemplary embodiment, the form data section 1202 can comprise contact information for the adjustment agency 312.

The cover sheet 1200 also comprises key data fields 1204 related to the check adjustment case. In the exemplary embodiment illustrated in FIG. 12, the key data fields 1204 comprise a routing number 1204a (synonymous with an ABA number) for the DI requesting the check adjustment; an amount 1204b of the requested check adjustment; a sender's reference number "SREF" 1204c, indicating an internal reference number of the requesting agency; an investigation type "ITYP" 1204d, indicating an error type; and a "DATE" 1204e, indicating the cash letter date for the item to which the case pertains. Additionally, if known, the key data fields 1204 can comprise a receiver's reference number "RREF" 1204f, which comprises the check adjustment case number assigned by the adjustment agency 312. Other key data, or combinations of key data, can be presented on the cover sheet 1200 within the scope of the present invention. For example, any of the key data discussed above with reference to the check adjustment message can be presented on the cover sheet 1200.

The DI 302 completes the facsimile cover sheet on the client computer 304 and prints the facsimile cover sheet for communication to the adjustment agency 312. The DI 302 then creates an electronic image of the cover sheet and an electronic image of the DTF using an image capturing device and communicates the electronic images to the adjustment agency 312.

In the exemplary embodiment illustrated in FIG. 3, the image capturing device comprises a facsimile machine 306. The DI 302 communicates the facsimile cover sheet and the DTF to a facsimile/OCR server 318 via the facsimile machine 306. In operation, the facsimile machine 306 communicates an electronic image of the cover sheet and an electronic image of the DTF to the facsimile/OCR server 318. As indicated by the dashed line in FIG. 3, the facsimile/OCR server 318 can be part of the adjustment agency's 312 architecture. Alternatively, the facsimile/OCR server 318 can be provided at a third party location.

The facsimile/OCR server 318 receives the electronic images. Then, the facsimile/OCR server performs optical character recognition ("OCR") on the electronic cover sheet image and converts the key data from the electronic cover sheet image into an electronic text file. The facsimile/OCR server 318 also converts the electronic cover sheet image and DTF image into electronic DTF image files. Then, the facsimile/OCR server 318 temporarily stores the electronic text file and the electronic DTF image files.

In an exemplary embodiment, the facsimile/OCR server 318 also can create a timing file, indicating the creation time and other statistical data for the electronic text and DTF image files, and a completion indicator file, indicating that the electronic text and DTF image files are complete. The facsimile/OCR server 318 can associate the text, DTF image, timing, and completion indicator files by providing those files with the same name and a different extension. For example, the text file can be named "DTF.txt" and the DTF file can be named "DTF.tif."

A DTF archive 320 of the adjustment agency 312 periodically polls the facsimile/OCR server 318 for one or more completed DTF files by determining whether a completion file exists. If the facsimile/OCR server contains a completed file, then the DTF archive 320 downloads the associated text, DTF images, timing, and completion indicator files. Then, the DTF archive 320 associates in an index table the key data from the text file with the DTF image file and stores the DTF image file.

The check adjustment server 316 periodically scans the DTF archive 320 to match stored electronic check adjustment messages with stored electronic DTF image files. To match the message with the appropriate DTF image, the check adjustment sever 316 compares the key data for a check adjustment message to the key data associated with the DTF image files stored in the DTF archive 320. If the check adjustment server 316 finds matching key data, then the check adjustment server 316 links the matching DTF image file and check adjustment message by updating the DTF archive index table to associate the case number of the check adjustment message with the respective DTF image file.

An operator of the adjustment agency 312 operates a client computer 322 to access the check adjustment server 316 for resolving the check adjustment case. The operator can retrieve an electronic check adjustment message from the check adjustment server 316. Additionally, the operator can retrieve the linked DTF image file by selecting an icon in the message that retrieves the DTF image file(s) associated with the check adjustment message. Then, the operator resolves the check adjustment case using the electronic check adjustment message and the electronic DTF image(s).

The DI 302 can obtain information from the DTF archive 320 via the web server 314 to view the stored DTF image files. Additionally, the DI 302 can obtain information from the check adjustment server 316 via the web server 314 to view the stored check adjustment messages and to determine the status of a check adjustment case.

As illustrated by the exemplary embodiment of FIG. 3, the image capturing device of the DI 302 alternatively can comprise a scanner 308. Accordingly, the scanner 308 can provide an alternative method for populating the DTF archive 320 with electronic DTF files. The DI 302 can scan the DTF using the scanner 308 to create an electronic DTF image, associate the relevant key data for the check adjustment case with the electronic DTF image, and transmit the electronic DTF image and associated key data to the DTF archive 320. In an exemplary embodiment, the DI 302 can attach the electronic DTF image to an e-mail comprising the key data and can forward the e-mail to the DTF archive 320.

The adjustment agency 312 also can initiate a check adjustment case. As illustrated in the exemplary embodiment of FIG. 3, the adjustment agency 312 can create and communicate an electronic check adjustment message to the check adjustment server 316 and the DI 302 using the client computer 322. The adjustment agency 312 also can create a facsimile cover page using the client computer 322. Additionally, the adjustment agency 312 comprises an image capturing device, such as the facsimile machine 324 or the scanner 326, for populating the DTF archive 320 as discussed above. When the adjustment agency 312 initiates the check adjustment case, the DI 302 can access the DTF archive 320 and the check adjustment server 316 via the web server 314 to view the relevant files and determine the status of the case. Additionally, the adjustment agency 312 can communicate the relevant files to the DI 302 via the Internet 310.

Figure 4:
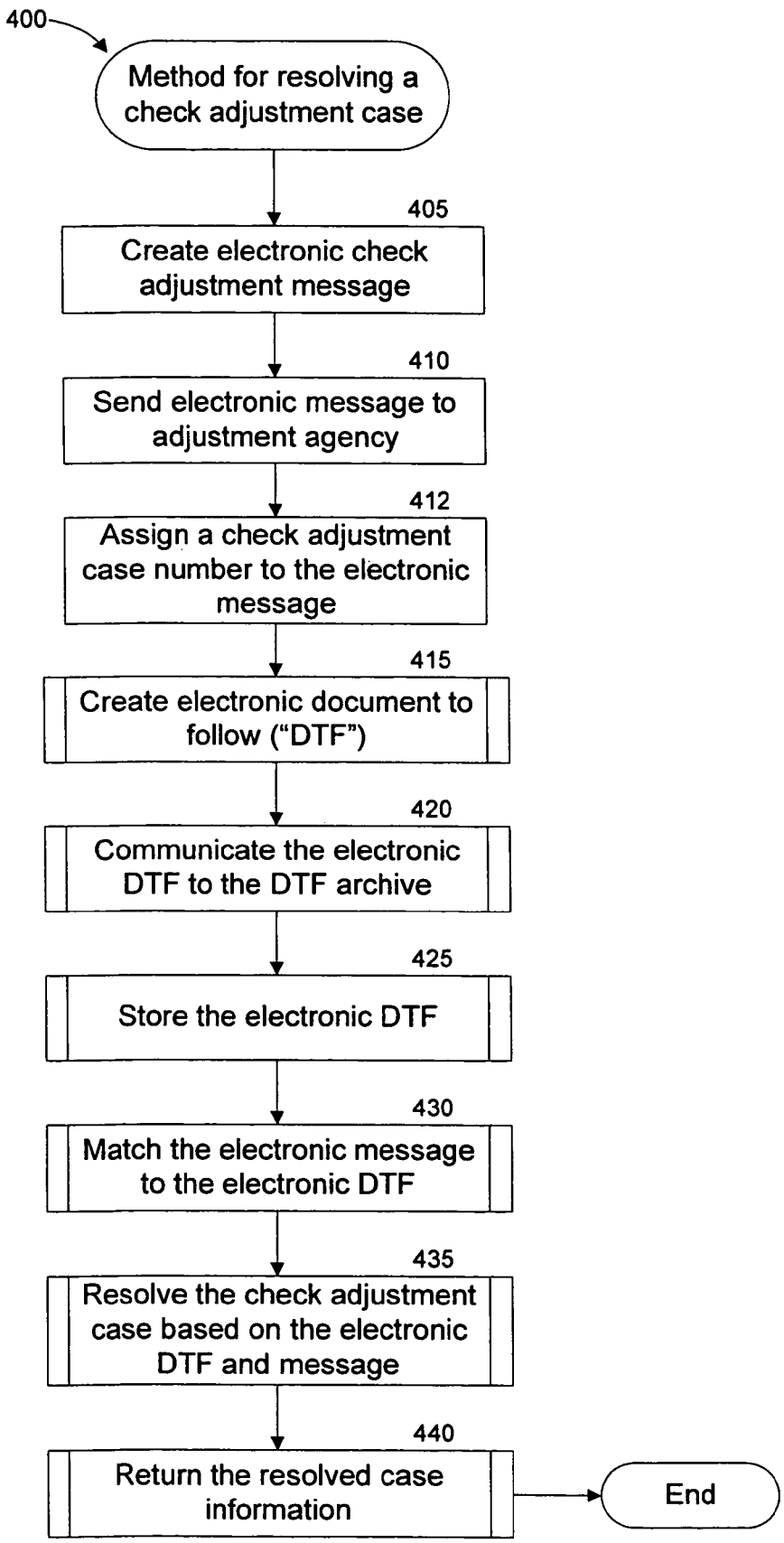
FIG. 4 is a flow chart depicting a method for resolving a check adjustment case according to an exemplary embodiment of the present invention.

FIG. 4 is a flow chart depicting a method 400 for resolving a check adjustment case according to an exemplary embodiment of the present invention. In step 405, a requesting agency, such as the DI 302, an intermediary bank, a paying bank, or other depository institution, creates an electronic check adjustment message. The electronic check adjustment message comprises key data relating to the check adjustment case. The requesting agency sends the electronic message in step 410 to the check adjustment server 316. In step 412, the check adjustment server 316 assigns a check adjustment case number to the electronic message.

The requesting agency creates an electronic DTF in step 415 and communicates the electronic DTF in step 420 to the DTF archive 320. In step 425, the DTF archive 320 stores the electronic DTF. The check adjustment server 316 matches the electronic message to the electronic DTF in step 430. Then, in step 435, an operator of the adjustment agency 312 resolves the check adjustment case based on the electronic DTF and the electronic message. Finally, the operator returns resolved case information to the requesting agency in step 440.

Figure 5:
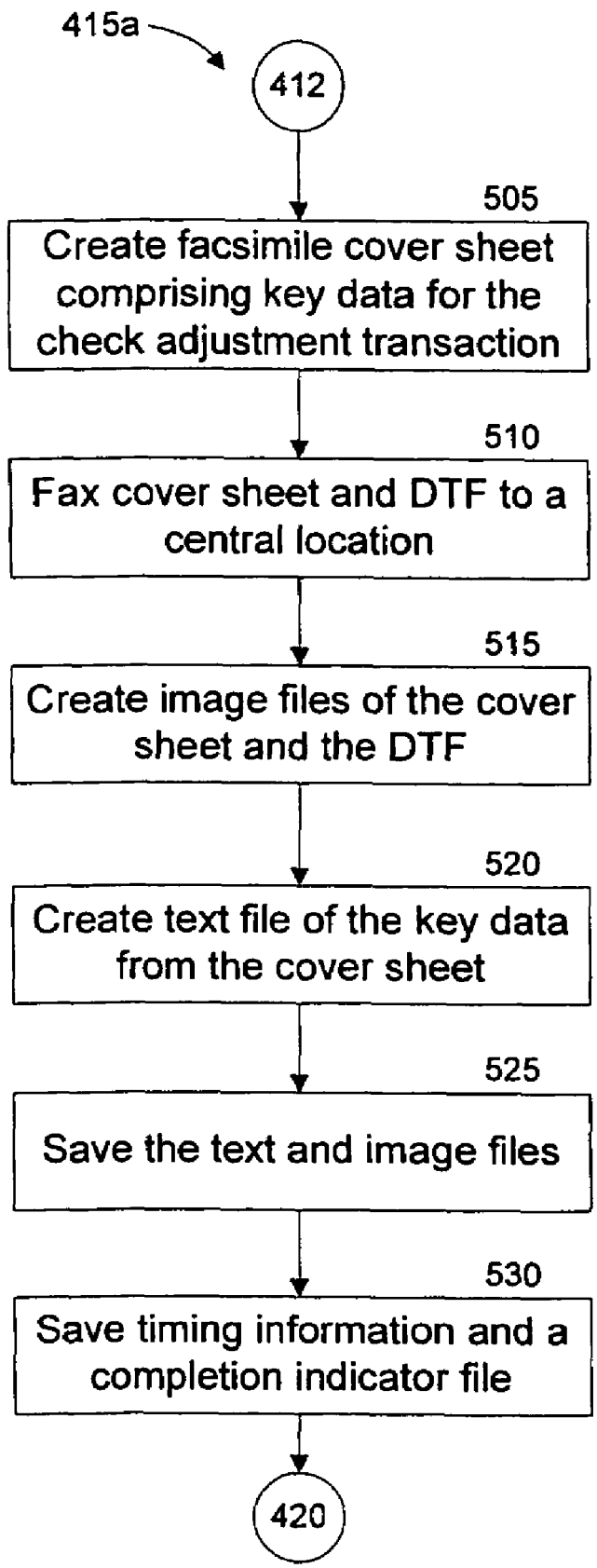
FIG. 5 is a flow chart depicting a method for creating an electronic document to follow according to an exemplary embodiment of the present invention.

FIG. 5 is a flow chart depicting a method 415a for creating an electronic document to follow according to an exemplary embodiment of the present invention, as illustrated in step 415 of FIG. 4. In step 505, the requesting agency creates a facsimile cover sheet comprising the key data relating to the check adjustment case. In step 510, the requesting agency communicates the cover sheet and the DTF to a central location via the facsimile machine 306. The central location can comprise the facsimile/OCR server 318. The facsimile/OCR server 318 receives the facsimile images of the cover sheet and the DTF and creates in step 515 separate electronic image files of the cover sheet and the DTF. Additionally, in step 520, the facsimile/OCR server 318 performs optical character recognition ("OCR") of the key data in the cover sheet image and creates a text file of the key data from the cover sheet.

In step 525, the facsimile/OCR server 318 temporarily saves the electronic text and DTF image files. Additionally, in step 530, the facsimile/OCR server 318 saves a timing information file, indicating the creation time and other statistical data for the electronic text and DTF image files. Finally, the facsimile/OCR server 318 creates in step 530 a completion indicator file, which indicates that the text, DTF image, and timing files are ready for downloading to the DTF archive 320. The method 415a then proceeds to step 420 (FIG. 4).

Figure 6:
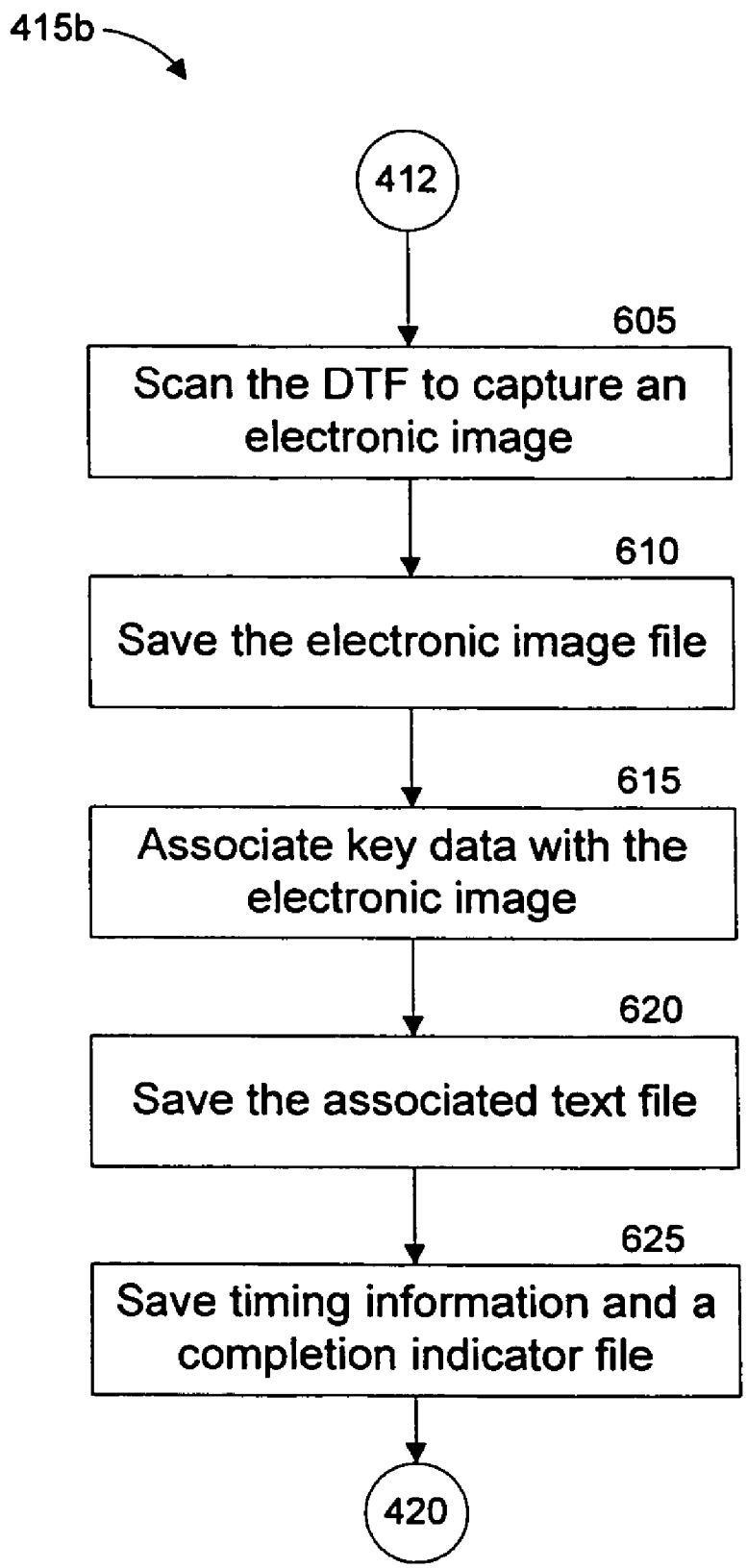
FIG. 6 is a flow chart depicting a method for creating an electronic document to follow according to an alternative exemplary embodiment of the present invention.

FIG. 6 is a flow chart depicting a method 415b for creating an electronic document to follow according to an alternative exemplary embodiment of the present invention, as referred to in step 415 of FIG. 4. In step 605, the requesting agency scans the DTF using the scanner 308 to capture an electronic image of the DTF. In step 610, the scanner 308 temporarily saves the electronic DTF image file. Then, the requesting agency associates in step 615 the key data with the electronic DTF image file. To associate the key data with the electronic DTF image file, the requesting agency can manually input the key data for the electronic DTF image file into an associated text file. Alternatively, the requesting agency can scan a cover sheet comprising the key data and can associate in a text file the key data with the electronic DTF image file, in a manner similar to that of the facsimile/OCR server 318 discussed above. In step 620, the scanner 306 temporarily saves the text file comprising the associated key data.

In step 625, the scanner 308 saves a timing information file, indicating the creation time and other statistical data for the electronic text and DTF image files. Finally, the scanner 308 creates in step 625 a completion indicator file, which indicates that the text, DTF image, and timing files are ready for downloading to the DTF archive 320. The method 415b then proceeds to step 420 (FIG. 4).

Figure 7:
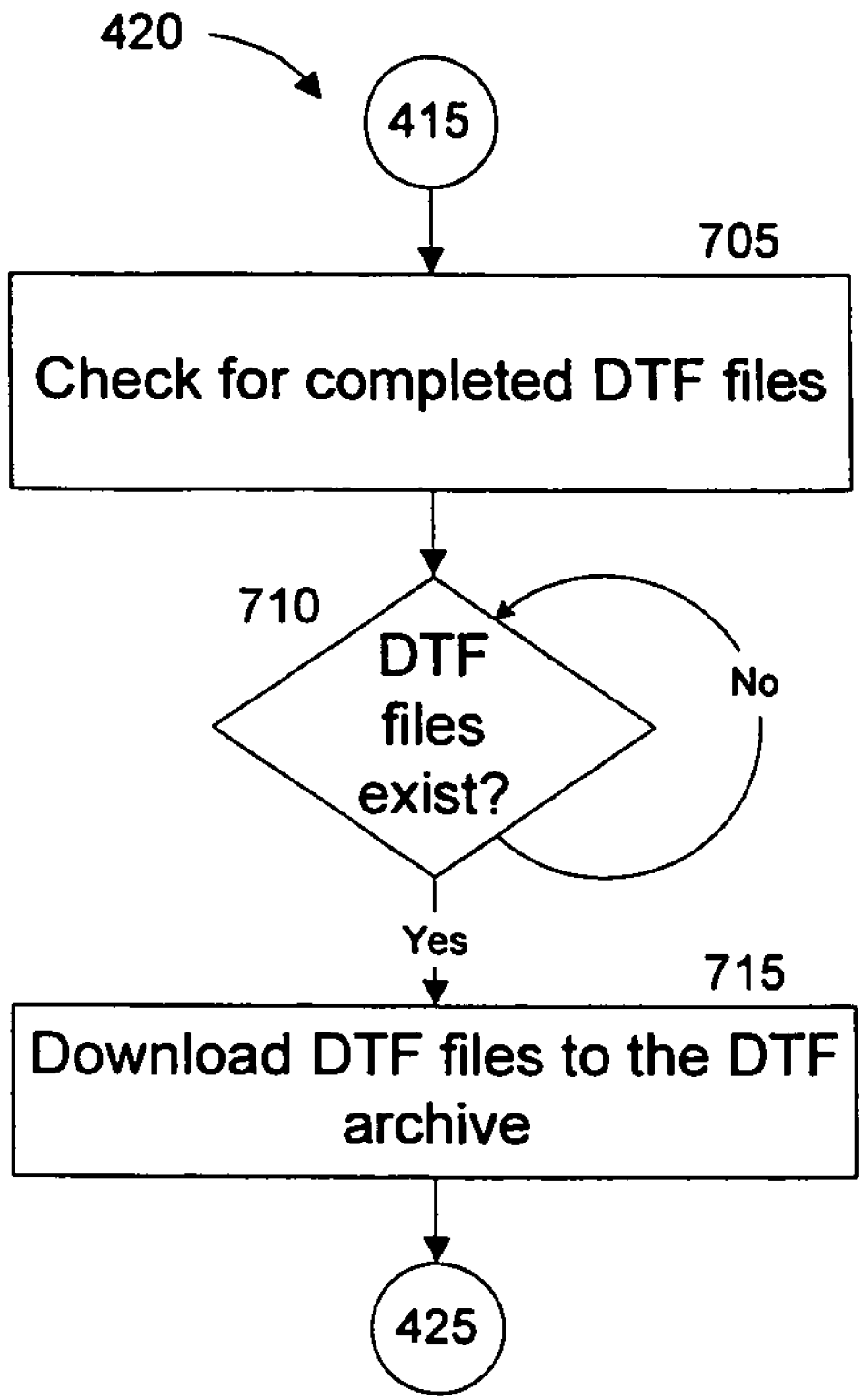
FIG. 7 is a flow chart depicting a method for communicating the electronic document to follow to a document to follow archive according to an exemplary embodiment of the present invention.

FIG. 7 is a flow chart depicting a method 420 for communicating the electronic DTF to the DTF archive 320 according to an exemplary embodiment of the present invention, as referred to in step 420 of FIG. 4. In step 705, the DTF archive 320 checks the facsimile/OCR server 318 for completed electronic DTF files. In an alternative embodiment, the DTF archive 320 can check the scanner 308 for completed electronic DTF files. In step 710, the DTF archive 320 determines whether completed DTF files exist at the facsimile/OCR server 318. In an alternative embodiment, the DTF archive 320 determines whether DTF files exist at the scanner 308.

If DTF files do not exist, then the method 420 repeats step 710 until DTF files exist at the facsimile/OCR server 318 for downloading to the DTF archive 320. To determine if DTF files exist at the facsimile/OCR server 318, the DTF archive 320 checks for associated files having a completion indicator file.

If the method 420 determines in step 710 that DTF files exist, then the DTF archive 320 downloads in step 715 the electronic DTF files from the facsimile/OCR server 318. The electronic DTF files comprise the text file, the electronic cover sheet and DTF image files, the timing file, and the completion indicator file for each check adjustment case. The method 420 then proceeds to step 425 (FIG. 4).

As discussed, in an alternative embodiment, steps 705-715 can comprise the DTF archive 320 checking the scanner 308 for completed electronic DTF files and downloading those files from the scanner 308.

Figure 8:
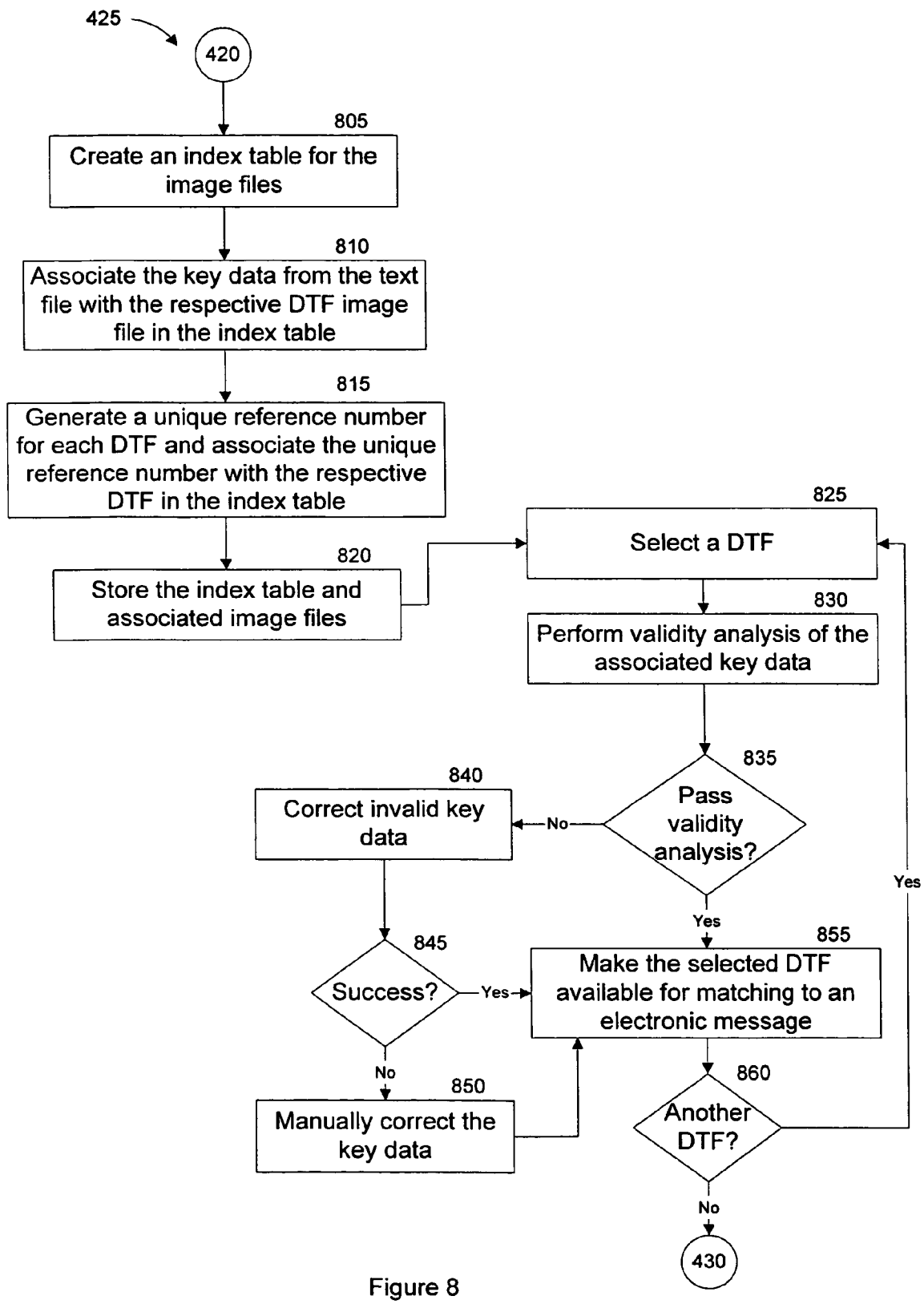
FIG. 8 is a flow chart depicting a method for storing the electronic document to follow according to an exemplary embodiment of the present invention.

FIG. 8 is a flow chart depicting a method 425 for storing the electronic DTF according to an exemplary embodiment of the present invention, as referred to in step 425 of FIG. 4. In step 805, an index table for the DTF image files is created in the DTF archive 320. In step 810, the DTF archive 320 associates in the index table the key data from the electronic text file with its respective electronic DTF image file. In operation, the DTF archive 320 parses the key data from the text file and associates the parsed key data with the respective electronic DTF image file.

The DTF archive 320 generates a unique reference number in step 815 for each DTF image file and associates in the index table the unique reference number with the respective DTF image file. Then, in step 820, the DTF archive 320 stores the index table and associated DTF image files.

In step 825, the DTF archive selects a downloaded DTF image file. In step 830, the DTF archive 320 performs a validity analysis on the key data associated with the selected DTF image file. For example, the DTF archive 320 can verify that the key data fields in the index table comprise the correct number of data elements (letters, numbers, and special characters) and that the key data fields comprise the proper alpha/numeric combination of data elements for the respective key data field.

All of the key data fields 1204 (FIG. 12), except the SREF 1204c, have a specific format. For example, the amount 1204b requires a valid dollar amount with commas and a decimal, the routing number 1204a requires a nine-digit numeric number, and the investigation type 1204d requires a two to four-letter identifier. Thus, the DTF archive 320 can verify that the associated key data meets the specific format for each data field having a specified format.

In step 835, the DTF archive 320 determines whether the key data passed the validity analysis. For example, the key data passes the validity analysis if the key data fields comprise the correct number of data elements and the proper combination of alpha/numeric data elements.

If the key data passes the validity analysis, then the method 425 branches to step 855, discussed below. If the key data does not pass the validity analysis, then the method 425 branches to step 840. In step 840, the DTF archive 320 corrects the invalid key data. In an exemplary embodiment, the DTF archive corrects the key data by parsing the corresponding text file a second time and re-associating the key data with the DTF image file.

In step 845, the DTF archive 320 determines whether the key data correction was successful. For example, the DTF archive can determine whether any information changed after the re-association of key data performed in step 840. If the correction was not successful in step 845, then the method 425 branches to step 850 in which the operator is alerted to an error for manual correction of the key data. After manual correction, the method 425 proceeds to step 855. If the method 425 determines in step 845 that the key data correction was successful, then the method 425 branches directly to step 855.

In step 855, the DTF archive 320 sets an indicator flag to make the selected DTF image file available for matching to an electronic check adjustment message. In step 860, the DTF archive 320 determines whether to perform a validity analysis of the key data associated with another DTF image file. If yes, then the method 425 branches back to step 825 to select another DTF image file. If the DTF archive 320 will not perform another validity analysis, then the method 425 branches to step 430 (FIG. 4).

Figure 9:
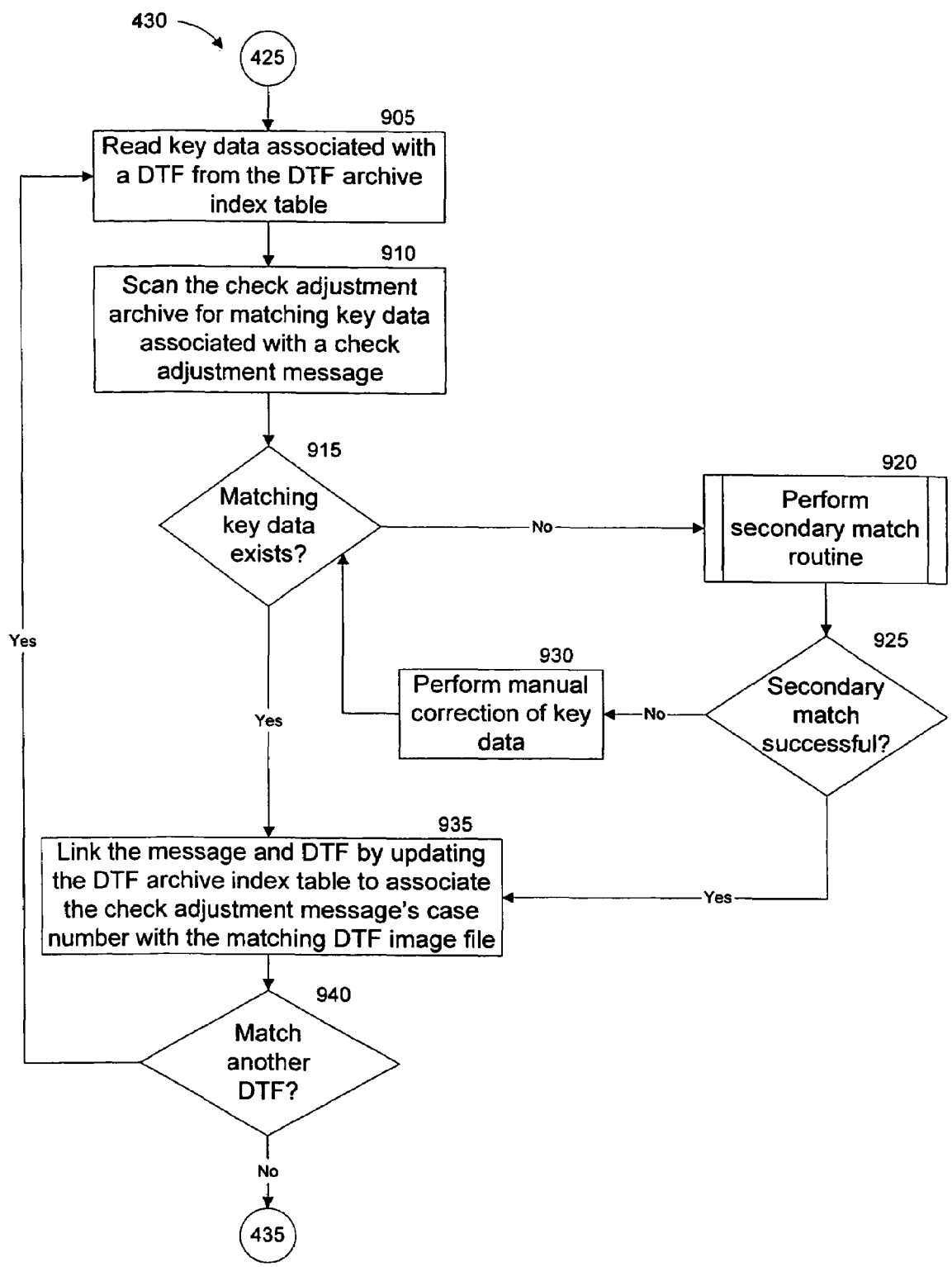
FIG. 9 is a flow chart depicting a method for matching an electronic check adjustment message to an electronic document to follow according to an exemplary embodiment of the present invention.

FIG. 9 is a flow chart depicting a method 430 for matching an electronic check adjustment message to an electronic document to follow according to an exemplary embodiment of the present invention, as referred to in step 430 of FIG. 4. In step 905, the check adjustment server 316 reads the key data associated with a DTF image file in the DTF archive index table. Then, in step 910, the check adjustment server 316 scans stored check adjustment messages for associated key data that matches the key data associated with the DTF image file.

In step 915, the check adjustment server 316 determines whether matching key data exists for the DTF image file and a stored check adjustment message. If matching key data for the DTF image file does not exist, then the method 430 proceeds to step 920. In step 920, the DTF server 320 performs a secondary match routine.

In an exemplary embodiment, the secondary match routine can comprise correcting data elements of the key data stored in the DTF archive 320. For example, the key data can comprise the following key data fields 1204 as illustrated in FIG. 12: a routing number 1204a (routing transit number) of the agency requesting the check adjustment case, a check adjustment amount 1204b, an internal reference number 1204c assigned by the requesting agency, an investigation type 1204d, and a cash letter date 1204e for the item to which the case pertains.

All of the key data fields except the internal reference number "SREF" 1204c have a specific format. For example, the routing number 1204a requires a nine digit numeric number, the amount 1204b requires a valid dollar amount with commas and a decimal, the investigation type 1204d requires a two to four-letter identifier, and the cash letter data 1204e requires a specific date format. Key data fields having a specific format achieve a higher level of OCR accuracy from commonly available OCR software. Additionally, the validity analysis performed by the DTF archive 320 improves the OCR accuracy and increases the matching rate achieved in step 915.

The internal reference number 1204c is freeform. In other words, any alpha/numeric data elements are allowed, including special characters and spaces. Accordingly, the internal reference number 1204c achieves a lower level of OCR accuracy from OCR software. The secondary match routine can improve the lower OCR accuracy associated with freeform text fields. In operation, the process corrects or ignores various common OCR problems and user typing errors when attempting a match.

For example, common OCR problems and typing errors include the following:
1. OCR misread characters: For example, OCR software often misreads similar characters, such as "8" and "B."
2. Upper case versus lower case, which generally involves a typing error.
3. Spaces and special characters: Differences in the number of spaces and the inclusion of special characters can comprise an OCR error or a data entry error.
4. Extra characters included: Dust on a page or in a FAX machine can cause an OCR error of inserting extra characters.

By adjusting for the types of errors listed above, the secondary match routine can match freeform fields that are "almost" identical.

In an exemplary embodiment, the secondary match routine can perform one or more of the following steps (see FIG. 13 which also describes the secondary match routine):
1. Treat the following groups of characters as if they comprise the same character:
   a. 1, {,}, [,], |, I, i, L, l, !
   b. 2, Z, z
   c. G, C, c
   d. 0, O, o
   e. B, 8
   f. S, s, $, 5
2. Remove any special characters other than those listed in the groups above (special characters comprise all characters other than letters or numbers).
3. Remove all spaces.
4. If the two fields differ in length, trim the longer field to be equal in length to the shorter field before comparison.
5. Convert all lower case letters to upper case letters.
6. Compare the "corrected" key data fields associated with a DTF image file to the key data associated with the stored check adjustment messages to determine if a match exists.

The present invention is not limited to the steps described above, and other steps for improving OCR accuracy of freeform fields are within the scope of the present invention. Additionally, the secondary match routine can comprise only one step or a sub-combination of steps discussed above to improve the match rate by compensating for OCR inaccuracies.

In step 925, the DTF server 320 determines whether the secondary match routine was successful. The secondary match routine is successful if the function identifies matching key data for a DTF image file and a stored check adjustment message. If the correction is not successful, then the method 430 branches to step 930. In step 930, the electronic DTF is presented to an operator to perform manual correction of the key data associated with the DTF. After manual correction of the key data, the method 430 proceeds back to step 915 to match the DTF image file to a stored check adjustment message.

If the method 430 determines in step 925 that the secondary match routine was successful, then the method 430 branches to step 935. Additionally, if the method 430 determines in step 915 that the key data of a DTF image matches the key data of a check adjustment message, then the method 430 branches directly to step 935. In step 935, the check adjustment server 316 links the electronic message and the electronic DTF image file by updating the DTF archive index table to associate the check adjustment message's case number with the matching DTF image file. Additionally, the check adjustment server 316 can link the message and DTF image file by associating the DTF image file's unique reference number with the check adjustment message.

The method 430 then proceeds to step 940. In step 940, the check adjustment server 316 determines whether to match another electronic DTF image file. If yes, then the method 430 branches back to step 905 to repeat the matching process. If not, then the method 430 branches to step 435 (FIG. 4).

The exemplary matching method 430 illustrated in FIG. 9 can provide high match rates of the key data associated with the electronic DTF image file and the electronic check adjustment message. In operation, using the key data fields 1204a-1204e (FIG. 12), the method 430 can achieve a match rate of up to 99%. In other words, the combination of the key data fields 1204a-1204e can produce a unique combination to match a DTF image file with the correct check adjustment message. Other combinations of key data are within the scope of the invention. Additionally, if the DTF image file has an associated case number in the key data field 1204f, then the method 430 can match the DTF image file and the check adjustment message based on that field only, or in combination with the other key data.

Figure 10:
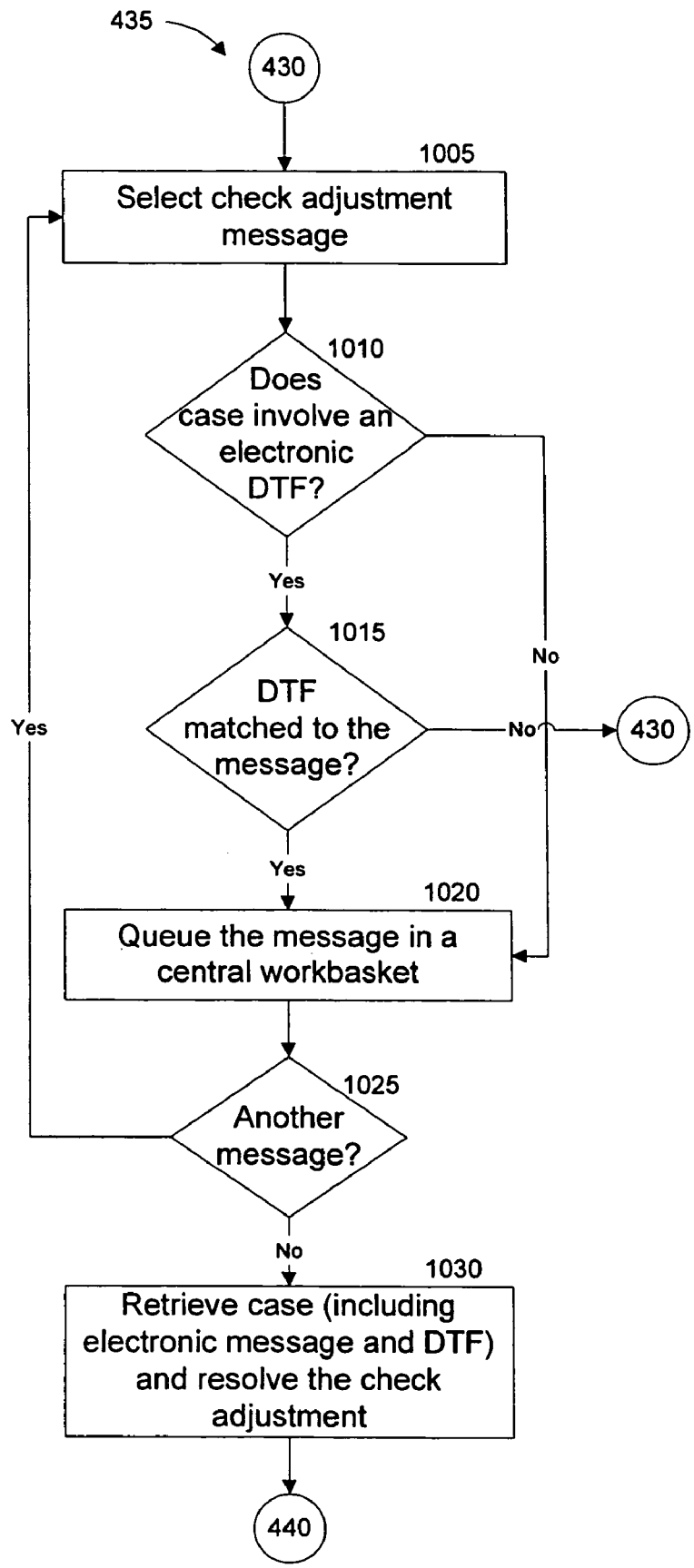
FIG. 10 is a flow chart depicting a method for resolving a check adjustment case based on the electronic check adjustment message and the linked electronic document to follow according to an exemplary embodiment of the present invention.

FIG. 10 is a flow chart depicting a method 435 for resolving a check adjustment case based on the electronic check adjustment message and the linked electronic DTF according to an exemplary embodiment of the present invention, as referred to in step 435 of FIG. 4. In step 1005, the check adjustment server 316 selects a stored check adjustment message. In step 1010, the check adjustment server 316 determines whether the check adjustment case involves an electronic DTF. To make that determination, the check adjustment server 316 reads the check adjustment message for an indication that a DTF is required to resolve the case. If a DTF is not involved, then the check adjustment server 316 queues the check adjustment message in a central workbasket to await resolution by an operator.

If the check adjustment case involves an electronic DTF, then the method 435 branches to step 1015. In step 1015, the check adjustment server determines whether the electronic DTF has been matched to the electronic check adjustment message for the check adjustment case. If not, then the method 435 branches back to step 430 to perform the matching routine, as discussed above with reference to FIG. 9. If the check adjustment server 316 determines in step 1015 that the electronic DTF has been matched to the check adjustment message, then the method 435 branches to step 1020. In step 1020, the check adjustment server 316 queues the check adjustment message in a central workbasket to await resolution by an operator.

In step 1025, the check adjustment server 316 determines whether to queue another check adjustment message. If yes, then the method 435 branches back to step 1005 to repeat the queuing process. If the method 435 will not queue another case, then the method 435 branches to step 1030.

In step 1030, an operator accesses the client computer 322 and retrieves a check adjustment case from the check adjustment server 316. The check adjustment case comprises the electronic check adjustment message and a link to any associated electronic DTF image(s). Then, the operator resolves the check adjustment case using the electronic check adjustment message and the linked electronic DTF image(s). The method 435 then proceeds to step 440 (FIG. 4).

In an exemplary embodiment, an operator from a location remote from the adjustment agency 312 can access the check adjustment server 316 to resolve a check adjustment case. Accordingly, the exemplary embodiment can remove geographic restrictions related to conventional paper check adjustment methods.

Figure 11:
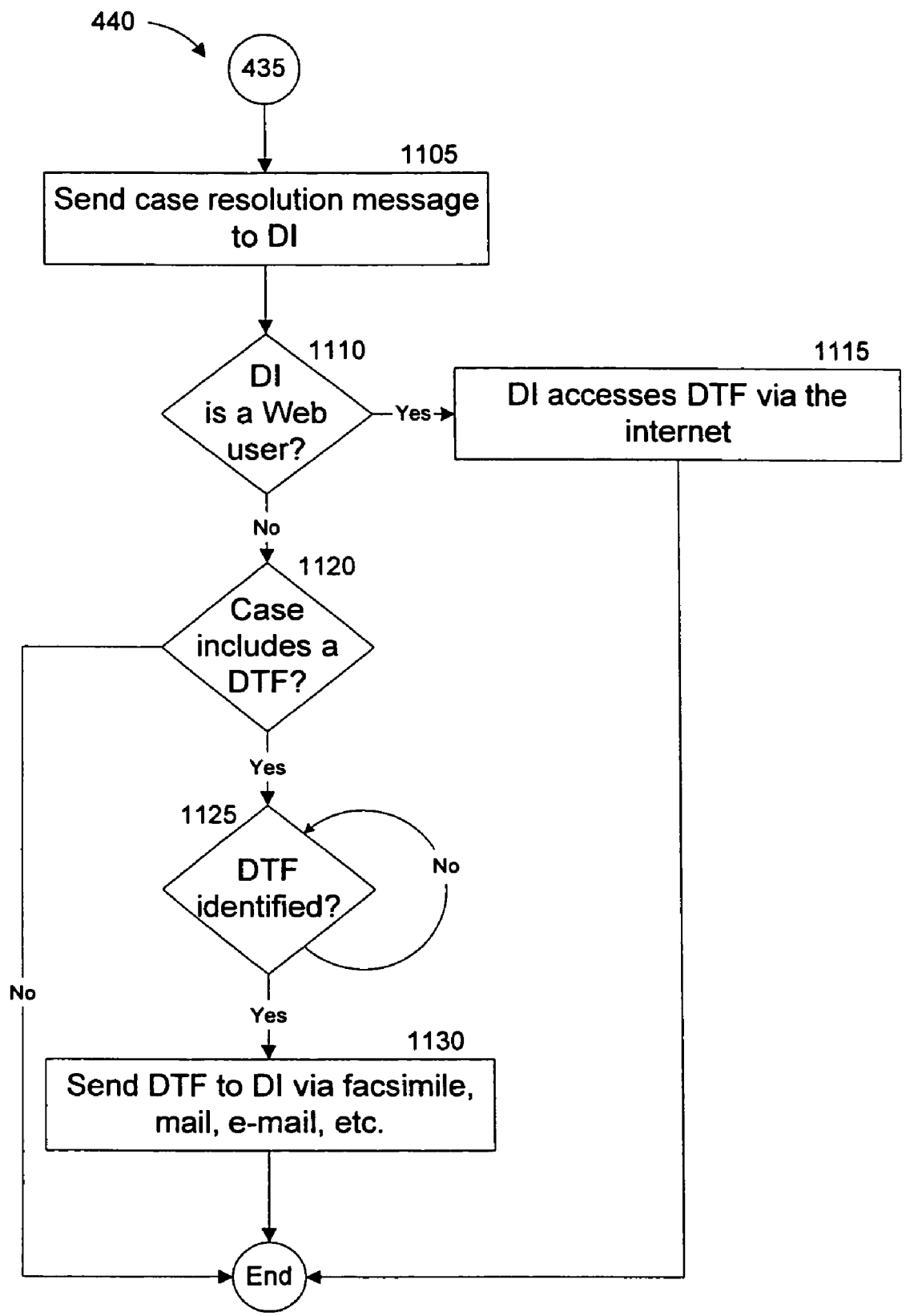
FIG. 11 is a flow chart depicting a method for returning the resolved case information to the depository institution according to an exemplary embodiment of the present invention.

FIG. 11 is a flow chart depicting a method 440 for returning resolved case information to the DI 302 according to an exemplary embodiment of the present invention, as referred to in step 440 of FIG. 4. According to an exemplary embodiment, the method 440 can return case resolution information for the check adjustment cases resolved using an electronic check adjustment message and an electronic DTF. Additionally, the method 440 can return case resolution information based on conventional paper and DOS methods for which an operator manually entered the case data into the check adjustment server 316 and DTF archive 320.

In step 1105, the operator accesses the client computer 322 and sends a case resolution message to the DI 302. The case resolution message indicates how the operator corrected the error for the check adjustment case. In step 1110, the check adjustment server 316 determines whether the DI 302 is a web user of the adjustment agency's 312 check adjustment architecture. If yes, then the method 440 branches to step 1115. In step 1115, the DI 302 can access, via the Internet 310 and the web server 314, the linked electronic DTF image stored in the DTF archive 320. To access the linked DTF, the DI 302 can select an icon in the case resolution message that references the linked DTF. The icon can reference the linked DTF by the associated case number or unique reference number.

If the method 440 determines in step 1110 that the DI 302 is not a web user, then the method 440 branches to step 1120. In step 1120, the check adjustment server 316 determines whether the check adjustment case includes a DTF. If not, then the method 440 ends, because the operator communicated all relevant case resolution information to the DI 302 in the case resolution message of step 1105.

If the method 440 determines in step 1120 that the case includes a DTF, then the method 440 branches to step 1125. In step 1125, the check adjustment server 316 determines whether the associated DTF has been identified and matched to the check adjustment message. If not, then the method 440 repeats step 1125 until the associated DTF is identified. The method 440 then branches to step 1130. In step 1130, the operator sends the DTF to the DI 302 via a conventional method. The conventional method can comprise facsimile, mail, e-mail, and other conventional methods.

Figure 13:
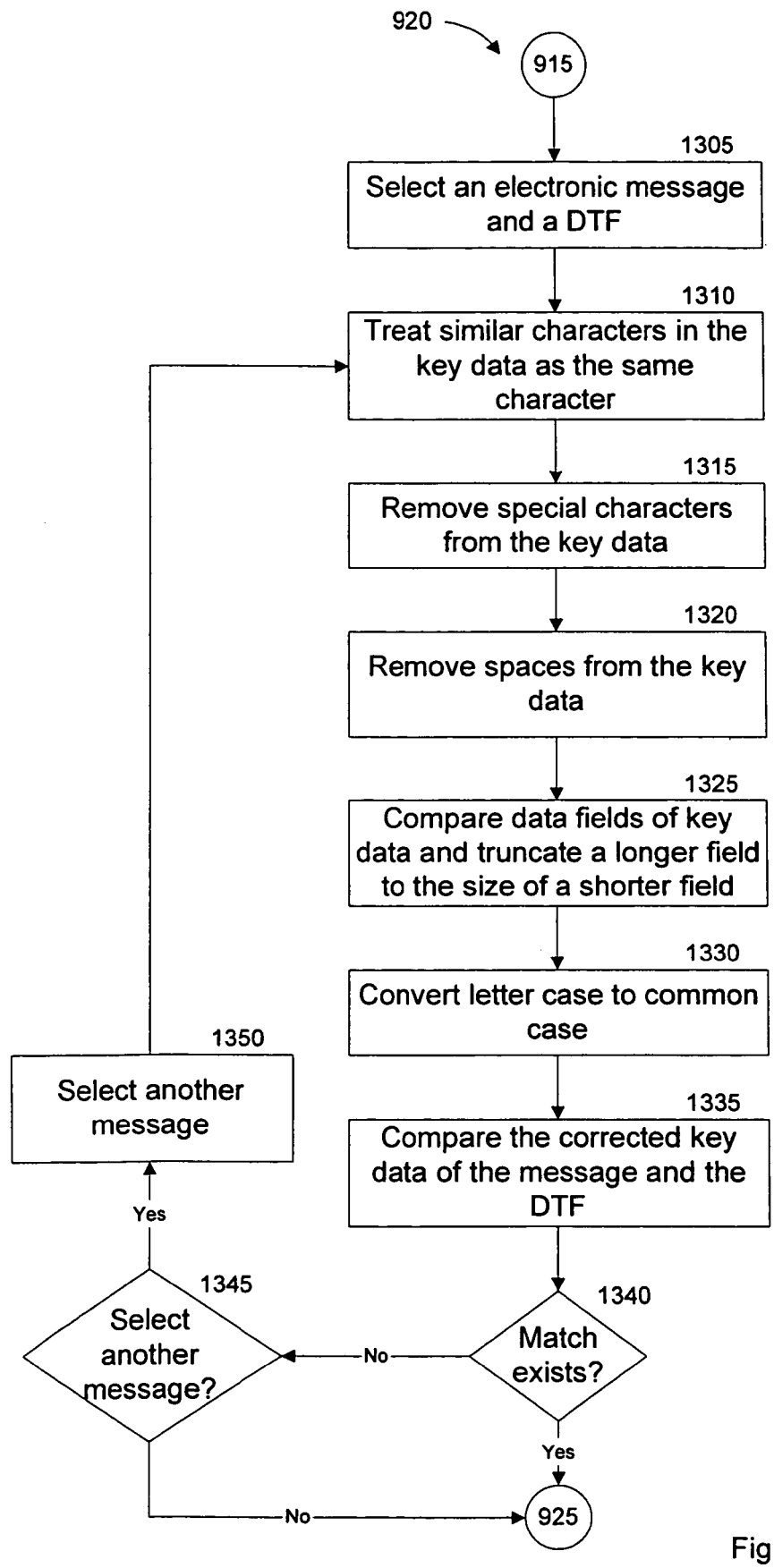
FIG. 13 is a flow chart depicting a method for performing a secondary match routine according to an exemplary embodiment of the present invention.

FIG. 13 is a flow chart depicting a method 920 for performing a secondary match routine according to an exemplary embodiment of the present invention, as referred to in step 920 of FIG. 9. In step 1305, the check adjustment server 316 selects an electronic check adjustment message for matching to the electronic DTF currently being processed. For the key data of the electronic message and the key data associated with the electronic DTF, the method 920 corrects the key data in key data fields having a specific format.

In step 1310, the check adjustment server 316 treats similar characters in the key data as the same character. For example, the check adjustment server 316 can treat the following groups of characters as if they comprise the same character: (a) 1, {,}, [,], |, I, i, L, l, !; (b) 2, Z, z; (c) G, C, c; (d) 0, O, o; (e) B, 8; and (f) S, s, $, 5.

In step 1315, the check adjustment server 316 removes special characters from the key data. For example, the check adjustment server 316 can remove all characters other than letters or numbers. In step 1320, the check adjustment server 316 removes all spaces from the key data.

In step 1325, the check adjustment server 316 compares data fields of the key data and truncates a longer field to the size of a shorter field. For example, the check adjustment server can compare the ABA data field of the check adjustment message to the ABA data field associated with the DTF and can truncate the longer field to the size of the shorter field.

In step 1330, the check adjustment server 316 converts the letter case of the key data to a common case. For example, the check adjustment server 316 can convert all letters to lower case or to upper case. Then, in step 1335, the check adjustment server 316 compares the key data as corrected in steps 1310-1330 to determine in step 1340 whether a match exists. For example, the check adjustment server 316 can compare the corrected key data of the check adjustment message with the corrected key data associated with the DTF to determine if the key data matches.

If the method 920 determines in step 1340 that a match exists, then the method 920 branches to step 925 (FIG. 9). If the method 920 determines in step 1340 that a match does not exist, then the method 920 branches to step 1345. In step 1345, the method 920 determines whether to select another check adjustment message for the secondary match routine. If yes, then the method 920 branches to step 1350 to select another message. The method 920 then proceeds back to step 1310 to correct the key data of the newly selected message and the key data associated with the DTF.

If the method 920 determines in step 1345 not to select another message, then the method branches to step 925 (FIG. 9.)

As discussed above, the present invention can eliminate the need for sending a paper DTF to resolve a check adjustment case. By allowing the communication of an electronic DTF image and matching that image with the respective electronic check adjustment message, conventional mailing and manual matching delays can be reduced. Additionally, by providing access to the electronic images and messages, remote operators can resolve check adjustment cases without having to physically review the paper documents. Depository institutions also can access the electronic images and messages to check case status and to review the supporting DTF.

The present invention can be used with computer hardware and software that performs the methods and processing functions described above. As will be appreciated by those skilled in the art, the systems, methods, and procedures described herein can be embodied in a programmable computer, computer executable software, or digital circuitry. The software can be stored on computer readable media. For example, computer readable media can include a floppy disk, RAM, ROM, hard disk, removable media, flash memory, memory stick, optical media, magneto-optical media, CD-ROM, etc.

Digital circuitry can include integrated circuits, gate arrays, building block logic, field programmable gate arrays (FPGA), etc.

Although specific embodiments of the present invention have been described above in detail, the description is merely for purposes of illustration. Various modifications of, and equivalent steps corresponding to, the disclosed aspects of the exemplary embodiments, in addition to those described above, can be made by those skilled in the art without departing from the spirit and scope of the present invention defined in the following claims, the scope of which is to be accorded the broadest interpretation so as to encompass such modifications and equivalent structures.

What is claimed is:

1. A method for communicating and matching electronic files for a check adjustment case, comprising the steps of:
   receiving by a computer system an electronic check adjustment text message comprising key data relating to the check adjustment case;
   receiving by the computer system an electronic file comprising an image of a document to follow ("DTF") associated with the key data relating to the check adjustment case;
   determining by the computer system whether the text message's key data matches the key data associated with the image of the DTF; and
   linking in the computer system the text message to the image of the DTF in response to a determination that the text message's key data matches the key data associated with the image of the DTF.

2. The method according to claim 1, wherein said step of receiving an electronic file comprises the steps of:
   receiving a cover page comprising the key data;
   receiving the image of the DTF; and
   associating the key data from the cover page with the image of the DTF.

3. The method according to claim 2, wherein said step of receiving an electronic file further comprises the steps of:
   creating an electronic text file comprising the key data from the cover page; and
   creating an electronic DTF image file comprising the image of the DTF, and
   wherein said step of determining whether the text message's key data matches the key data associated with the image of the DTF comprises determining whether the text message's key data matches the key data in the electronic text file.

4. The method according to claim 1, further comprising the step of assigning a check adjustment case number to the text message,
   wherein said linking step comprises associating the case number assigned to the text message with the image of the DTF.

5. The method according to claim 1, further comprising the steps of correcting errors in the key data associated with the image of the DTF and performing a secondary match routine to determine whether the text message's key data matches the corrected key data, in response to a determination that the key data associated with the image of the DTF does not match the text message's key data,
   wherein said step of linking the text message to the image of the DTF is performed in response to a determination that the corrected key data matches the text message's key data.

6. The method according to claim 5, wherein said step of correcting errors in the key data associated with the image of the DTF comprises treating groups of characters in the key data as the same character.

7. The method according to claim 6, wherein the groups of characters treated as the same character comprise (a) 1, {,}, [,], |, I, i, L, l, !; (b) 2, Z, z; (c) G, C, c; (d) 0, O, o; (e) B, 8; and (f) S, s, $, 5.

8. The method according to claim 6, wherein said step of correcting errors in the key data associated with the image of the DTF further comprises removing characters other than letters and numbers from the key data.

9. The method according to claim 6, wherein said step of correcting errors in the key data associated with the image of the DTF further comprises determining whether the text message's key data comprises a different field length than the key data associated with the image of the DTF, and reducing the longer field to equal the shorter field in response to a determination that the text message's key data comprises a different field length than the key data associated with the image of the DTF.

10. The method according to claim 6, wherein said step of correcting errors in the key data associated with the image of the DTF further comprises converting letters in the key data to a common case.

11. The method according to claim 6, wherein said step of correcting errors in the key data associated with the image of the DTF further comprises:
   removing characters other than letters and numbers from the key data;
   removing spaces from the key data;
   determining whether the text message's key data comprises a different field length than the key data associated with the image of the DTF, and reducing the longer field to equal the shorter field in response to a determination that the text message's key data comprises a different field length than the key data associated with the image of the DTF; and
   converting letters in the key data to a common case.

12. The method according to claim 1, wherein said step of receiving an electronic file comprises the steps of:
   receiving a facsimile cover page comprising the key data;
   receiving a facsimile image of the DTF;
   creating an electronic text file comprising the key data from the facsimile cover page;
   creating an electronic DTF image file comprising the facsimile image of the DTF; and
   associating the text file with the DTF image file.

13. The method according to claim 12, wherein said associating step comprises creating an index table that associates the key data from the text file with the DTF image file.

14. The method according to claim 13, further comprising the step of accessing the linked text message and the image of the DTF to resolve the cheek adjustment case.

15. The method according to claim 13, wherein the key data related to the cheek adjustment case comprises at least one data element selected from the group consisting of a routing number of an agency requesting the check adjustment case, a check adjustment amount, an internal reference number assigned by the requesting agency, an investigation type, and a cash letter date.

16. The method according to claim 13, further comprising the step of assigning a unique reference number to the DTF image file,
   wherein said linking step further comprises associating the unique reference number assigned to the DTF image file with the text message.

17. The method according to claim 16, further comprising the step of accessing the DTF image file through the association provided by the unique reference number assigned to the DTF image file and associated with the text message.

18. A computer-readable medium having embodied therein computer-executable instructions that when executed cause a computer to implement a process for communicating and matching electronic files for a check adjustment case, which comprises the steps of:
receiving an electronic check adjustment text message comprising key data relating to the check adjustment case;
receiving an electronic file comprising an image of a document to follow ("DTF") associated with the key data relating to the check adjustment case;
determining whether the text message's key data matches the key data associated with the image of the DTF; and
linking the text message to the image of the DTF in response to a determination that the text message's key data matches the key data associated with the image of the DTF.

19. A method for communicating and matching electronic files for a transaction, comprising the steps of:
receiving by a computer system an electronic text message comprising key data relating to the transaction;
receiving by the computer system an electronic file comprising an image of a document associated with the key data relating to the transaction;
determining by the computer system whether the text message's key data matches the key data associated with the image of the document; and
linking in the computer system the text message to the image of the document in response to a determination that the text message's key data matches the key data associated with the image of the document.

20. The method according to claim 19, wherein said step of receiving an electronic file comprises the steps of:
receiving an electronic image of a cover page comprising the key data;
receiving the image of the document; and
associating the key data from the cover page image with the image of the document.

21. The method according to claim 19, further comprising the step of assigning a transaction reference number to the text message,
wherein said linking step comprises associating the reference number assigned to the text message with the image of the document.

22. The method according to claim 19, further comprising the steps of correcting errors in the key data associated with the image of the document and performing a secondary match routine to determine whether the text message's key data matches the corrected key data, in response to a determination that the key data associated with the image of the document does not match the text message's key data,
wherein said step of linking the text message to the image of the document is performed in response to a determination that the corrected key data matches the text message's key data.

23. The method according to claim 22, wherein said step of correcting errors in the key data associated with the image of the document comprises treating groups of characters in the key data as the same character.

24. The method according to claim 23, wherein the groups of characters treated as the same character comprise (a) 1, {,}, [,], |, I, i, L, l, !; (b) 2, Z, z; (c) G, C, c; (d) 0, O, o; (e) B, 8; and (f) S, s, $, 5.

25. The method according to claim 23, wherein said step of correcting errors in the key data associated with the image of the document further comprises removing spaces from the key data.

26. The method according to claim 23, wherein said step of correcting errors in the key data associated with the image of the document further comprises determining whether the text message's key data comprises a different field length than the key data associated with the image of the document, and reducing the longer field to equal the shorter field in response to a determination that the text message's key data comprises a different field length than the key data associated with the image of the document.

27. The method according to claim 23, wherein said step of correcting errors in the key data associated with the image of the document further comprises converting letters in the key data to a common case.

28. The method according to claim 23, wherein said step of correcting errors in the key data associated with the image of the document further comprises:
removing characters other than letters and numbers from the key data;
removing spaces from the key data;
determining whether the text message's key data comprises a different field length than the key data associated with the image of the document, and reducing the longer field to equal the shorter field in response to a determination that the text message's key data comprises a different field length than the key data associated with the image of the document; and
converting letters in the key data to a common case.

29. The method according to claim 19, wherein said step of receiving an electronic file comprises the steps of:
receiving a facsimile cover page comprising the key data;
receiving a facsimile image of the document;
creating an electronic text file comprising the key data from the facsimile cover page;
creating an electronic document image file comprising the facsimile image of the document; and
associating the text file with the document image file.

30. The method according to claim 29, wherein said associating step comprises creating an index table that associates the key data from the text file with the document image file.

31. The method according to claim 30, further comprising the step of accessing the linked text message and document image file to resolve the transaction.

32. The method according to claim 30, further comprising the step of assigning a unique reference number to the document image file,
wherein said linking step further comprises associating the unique reference number assigned to the document image file with the text message.

33. The method according to claim 32, further comprising the step of accessing the document image file through the association provided by the unique reference number assigned to the document image file and associated with the text message.

34. The method according to claim 19, wherein the transaction comprises a check adjustment case.

35. A computer-readable medium having embodied therein computer-executable instructions that when executed cause a computer to implement a process for communicating and matching electronic files for a transaction, which comprises the steps of:
receiving an electronic text message comprising key data relating to the transaction;

receiving an electronic file comprising an image of a document associated with the key data relating to the transaction;

determining whether the text message's key data matches the key data associated with the image of the document; and linking the text message to the image of the document in response to a determination that the text message's key data matches the key data associated with the image of the document.

36. A method for communicating and matching electronic files for a check adjustment case, comprising the steps of:

communicating an electronic check adjustment text message comprising key data relating to the check adjustment case;

communicating an electronic image of a document to follow ("DTF") associated with the key data relating to the check adjustment case;

determining by a computer system whether the electronic text message's key data matches the electronic DTF image's key data; and linking in the computer system the electronic text message to the electronic DTF image in response to a determination that the electronic text message's key data matches the electronic DTF image's key data.

37. The method according to claim 36, further comprising the step of accessing the linked electronic text message and electronic DTF image to resolve the check adjustment case.

38. The method according to claim 36, wherein the key data relating to the check adjustment case comprises a routing number of an agency requesting the check adjustment case, a check adjustment amount, an internal reference number assigned by the requesting agency, an investigation type, and a cash letter date.

39. The method according to claim 36, further comprising the step of assigning a check adjustment case number to the text message, wherein said linking step comprises associating the case number assigned to the text message with the DTF image.

40. The method according to claim 36, further comprising the steps of correcting errors in the key data associated with the DTF image and performing a secondary match routine to determine whether the DTF image's corrected key data matches the text message's key data, in response to a determination that the DTF image's key data does not match the text message's key data, wherein said step of linking the text message to the DTF image is performed in response to a determination that the DTF image's corrected key data matches the text message's key data.

41. The method according to claim 36, wherein said step of communicating an electronic DTF image comprises the steps of:

communicating a facsimile cover page comprising the key data; and communicating a facsimile image of the DTF, wherein said method further comprises the steps of:

creating an electronic text file comprising the key data from the cover page;

creating an electronic DTF image file comprising the facsimile image of the DTF; and associating the text file and the DTF image file.

42. The method according to claim 41, wherein said associating step comprises creating an index table that associates the key data from the text file with the DTF image file.

43. The method according to claim 42, further comprising the step of accessing the linked text message and DTF image file to resolve the check adjustment case.

44. The method according to claim 42, wherein the key data related to the check adjustment case comprises at least one data element selected from the group consisting of a routing number of an agency requesting the check adjustment case, a check adjustment amount, an internal reference number assigned by the requesting agency, an investigation type, and a cash letter date.

45. The method according to claim 42, further comprising the step of assigning a unique reference number to the DTF image file, wherein said linking step further comprises associating the unique reference number assigned to the DTF image file with the text message.

46. The method according to claim 45, further comprising the step of accessing the DTF image file through the association provided by the unique reference number assigned to the DTF image file and associated with the text message.

47. A system for communicating and matching electronic files for a transaction, comprising the steps of:

means for receiving an electronic text message comprising key data relating to the transaction;

means for receiving an electronic file comprising an image of a document associated with the key data relating to the transaction;

means for determining whether the text message's key data matches the key data associated with the image of the document; and means for linking the text message to the image of the document in response to a determination that the text message's key data matches the key data associated with the image of the document.

48. The system according to claim 47, wherein said means for receiving an electronic file receives the electronic file by:

receiving an electronic image of a cover page comprising the key data;

receiving the image of the document; and associating the key data from the cover page image with the image of the document.

49. The system according to claim 47, further comprising means for assigning a transaction reference number to the text message, wherein said means for linking links the text message to the image of the document by associating the reference number assigned to the text message with the image of the document.

50. The system according to claim 47, further comprising means for correcting errors in the key data associated with the image of the document, in response to a determination that the key data associated with the image of the document does not match the text message's key data; and means for performing a secondary match routine to determine whether the text message's key data matches the corrected key data, wherein said means for linking links the text message to the image of the document in response to a determination that the corrected key data matches the text message's key data.

51. The system according to claim 47, wherein said means for receiving an electronic file receives the electronic file by:

receiving a facsimile cover page comprising the key data;

receiving a facsimile image of the document;

creating an electronic text file comprising the key data from the facsimile cover page;

creating an electronic document image file comprising the facsimile image of the document; and associating the text file with the document image file.

52. The system according to claim 51, wherein said means for associating comprises an index table that associates the key data from the text file with the document image file.

53. The system according to claim 47, wherein the transaction comprises a check adjustment case.

54. A system for communicating and matching electronic files for a check adjustment case, comprising:

a check adjustment server that receives an electronic check adjustment message comprising key data relating to the check adjustment case and to store a plurality of electronic check adjustment messages;

an archive that receives an electronic image of a document to follow ("DTF") comprising the key data relating to the check adjustment case and to store a plurality of electronic DTF images and associated key data for each electronic DTF image, wherein said check adjustment server determines whether a stored electronic message's key data matches a stored electronic DTF image's key data, and to link the respective electronic message to the respective electronic DTF image in response to a determination that the message's key data matches the DTF image's key data.

55. The system according to claim 54, wherein said check adjustment server assigns a check adjustment case number to the received check adjustment message, and wherein said check adjustment server links the respective electronic message to the respective electronic DTF image by associating the case number assigned to the electronic check adjustment message with the electronic DTF image.

56. The system according to claim 54, wherein said check adjustment server receives the electronic DTF image from a facsimile machine or a scanner.

57. The system according to claim 54, further comprising a facsimile/OCR server that:

receives the electronic DTF image and an electronic image of a cover page that comprises the key data relating to the check adjustment case;

creates, from the key data in the electronic cover page image, an electronic text file comprising the key data;

creates an electronic DTF image file comprising the DTF image; and communicates the electronic text and DTF image files to said archive, wherein said archive stores the electronic DTF image by storing the electronic DTF image file, and to receive the electronic text file, to parse the key data from the electronic text file, and to associate the parsed key data with the respective DTF image file stored in said archive.

58. The system according to claim 57, wherein the key data relating to the check adjustment case comprises a routing number of the agency requesting the check adjustment case, a check adjustment amount, an internal reference number assigned by the requesting agency, an investigation type, and a cash letter date.

59. The system according to claim 57, wherein said check adjustment server corrects errors in the key data associated with an electronic DTF image, in response to a determination that the DTF image's key data does not match the message's key data, and to perform a secondary match routine to determine whether the text message's key data matches the corrected key data, wherein said means for linking links the text message to the image of the document in response to a determination that the corrected key data matches the text message's key data.

60. The system according to claim 57, wherein said archive assigns a unique reference number to the stored DTF image, and wherein said check adjustment server associates the unique reference number with the stored check adjustment message linked to the stored DTF image.

* * * * *